United States Patent
Zook et al.

(10) Patent No.: US 9,650,150 B2
(45) Date of Patent: May 16, 2017

(54) TRANSLUCENT SEAL CAP

(71) Applicant: 3M INNOVATIVE PROPERTIES COMPANY, St. Paul, MN (US)

(72) Inventors: Jonathan D. Zook, Baytown Township, MN (US); Larry S. Hebert, Hudson, WI (US); Michael D. Swan, Lake Elmo, MN (US); Sheng Ye, Woodbury, MN (US); Susan E. DeMoss, Stillwater, MN (US); Robin E. Wright, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/783,913

(22) PCT Filed: Apr. 15, 2014

(86) PCT No.: PCT/US2014/034070
§ 371 (c)(1),
(2) Date: Oct. 12, 2015

(87) PCT Pub. No.: WO2014/172302
PCT Pub. Date: Oct. 23, 2014

(65) Prior Publication Data
US 2016/0068274 A1    Mar. 10, 2016

Related U.S. Application Data

(60) Provisional application No. 61/811,983, filed on Apr. 15, 2013.

(51) Int. Cl.
*A47G 3/00* (2006.01)
*B64D 37/06* (2006.01)
(Continued)

(52) U.S. Cl.
CPC ............. *B64D 37/06* (2013.01); *B64D 45/02* (2013.01); *F16B 33/004* (2013.01); *F16B 37/14* (2013.01)

(58) Field of Classification Search
CPC ....... B64D 37/06; B64D 45/02; F16B 33/004; F16B 37/14; A47G 3/00
(Continued)

(56) References Cited

U.S. PATENT DOCUMENTS 2,710,113 A    6/1955  Pritchard
2,927,495 A    3/1960  Barwood
(Continued)

FOREIGN PATENT DOCUMENTS

CN    102678927    9/2012
EP    2465777    6/2012
(Continued)

OTHER PUBLICATIONS

International Search Report for PCT International Application No. PCT/US2014/034070 mailed on Jul. 14, 2014, 4 pages.

*Primary Examiner* — Roberta Delisle
(74) *Attorney, Agent, or Firm* — Philip P. Soo

(57) ABSTRACT

The present disclosure provides methods and articles useful in sealing fasteners, including seal caps and in particular translucent or transparent seals or seal caps. In some embodiments, a seal cap which is optically translucent and optionally visibly transparent contains an uncured sealant, which is optionally optically translucent or visibly transparent, and is applied to a fastener. In some embodiments, the sealant is cured by application of actinic radiation to the sealant through the seal cap. In another aspect, a protected fastener construction is provided comprising: q) a fastener; r) a seal cap; and s) a cured sealant; wherein the sealant is optically translucent and optionally visibly transparent.

22 Claims, 6 Drawing Sheets

(51) Int. Cl.
*B64D 45/02* (2006.01)
*F16B 33/00* (2006.01)
*F16B 37/14* (2006.01)

(58) Field of Classification Search
USPC .......................... 411/372.5–372.6, 373, 377
See application file for complete search history.

(56) References Cited

U.S. PATENT DOCUMENTS

| | | | |
|---|---|---|---|
| 3,411,816 A * | 11/1968 | Andrews | F16B 33/004 |
| | | | 411/431 |
| 3,470,787 A | 10/1969 | Mackie | |
| 4,382,049 A | 5/1983 | Hofmeister | |
| 4,400,123 A | 8/1983 | Dunegan | |
| 4,519,974 A | 5/1985 | Bravenec | |
| 4,632,944 A * | 12/1986 | Thompson | C09J 4/00 |
| | | | 411/258 |
| 4,826,380 A | 5/1989 | Henry | |
| 4,905,631 A | 3/1990 | Hayes | |
| 4,971,745 A | 11/1990 | Ferenc | |
| 5,697,745 A | 12/1997 | Shaw | |
| 5,755,908 A | 5/1998 | Rayburn | |
| 6,036,804 A | 3/2000 | Rayburn | |
| 6,086,972 A * | 7/2000 | Rayburn | B25B 23/00 |
| | | | 411/373 |
| 7,438,974 B2 | 10/2008 | Obuhowich | |
| 7,967,587 B2 | 6/2011 | Bradely | |
| 8,520,358 B2 * | 8/2013 | Bessho | B64D 45/02 |
| | | | 361/218 |
| 8,717,736 B2 * | 5/2014 | Asahara | F16B 39/225 |
| | | | 361/218 |
| 8,882,423 B2 * | 11/2014 | Watanabe | F16B 37/14 |
| | | | 411/337 |
| 9,068,583 B2 * | 6/2015 | Bray | F16B 1/0071 |
| 9,163,656 B2 * | 10/2015 | Asahara | B64D 45/02 |
| 9,228,604 B2 * | 1/2016 | Dobbin | B64D 45/02 |
| 9,416,811 B2 * | 8/2016 | Dobbin | B64D 45/02 |
| 2005/0121665 A1 | 6/2005 | Gillissen | |
| 2008/0134971 A1 | 6/2008 | Bradely | |
| 2011/0272554 A1 | 11/2011 | Chow | |
| 2013/0186552 A1* | 7/2013 | Asahara | F16B 39/225 |
| | | | 156/92 |

FOREIGN PATENT DOCUMENTS

| | | |
|---|---|---|
| JP | 2-138488 | 5/1990 |
| JP | 3-69808 | 3/1991 |
| WO | WO 2014-172305 | 10/2014 |

* cited by examiner

TRANSLUCENT SEAL CAP

CROSS REFERENCE TO RELATED APPLICATIONS

This application is a national stage filing under 35 U.S.C. 371 of PCT/US2014/034070, filed Apr. 15, 2014, which claims priority to U.S. Application No. 61/811,983, filed Apr. 15, 2013, the disclosure of which is incorporated by reference in its/their entirety herein.

FIELD OF THE DISCLOSURE

This disclosure relates to methods and articles useful in sealing fasteners, including seal caps and in particular translucent or transparent seals or seal caps.

SUMMARY OF THE DISCLOSURE

Briefly, the present disclosure provides a method of protecting a fastener comprising the steps of: a) providing a fastener; b) providing a seal cap which defines an interior, wherein the seal cap is optically translucent; c) applying an uncured sealant to the interior of the seal cap or to the fastener or to both; and d) positioning the seal cap over the fastener such that at least a portion of the fastener resides in the interior of the seal cap. The method may additionally comprising the step of: e) curing the sealant by application of actinic radiation to the sealant through the seal cap. In some embodiments, the fastener protrudes from a first surface of a substrate article and, following steps c), d) and e), every portion of the fastener which protrudes from the first surface of the substrate article is covered by cured sealant or seal cap or both.

In another aspect, the present disclosure provides a method of protecting a fastener comprising the steps of: f) providing a fastener; g) providing a seal cap which defines an interior, wherein the seal cap is optically translucent, and wherein the interior of the seal cap contains a quantity of an uncured sealant; and h) positioning the seal cap over the fastener such that at least a portion of the fastener resides in the interior of the seal cap. In some embodiments, the seal cap and uncured sealant recited in step g) are at a temperature of less than 5° C., and wherein the method additionally comprises the step of: i) warming the seal cap and uncured sealant to a temperature of at least 20° C. In some embodiments, the method additionally comprising the step of: j) curing the sealant by application of actinic radiation to the sealant through the seal cap. In some embodiments, the fastener protrudes from a first surface of a substrate article and, following step j), every portion of the fastener which protrudes from the first surface of the substrate article is covered by cured sealant or seal cap or both.

In another aspect, the present disclosure provides a method of protecting a fastener comprising the steps of: k) providing a fastener; l) providing a seal cap mold which defines an interior; m) applying an uncured sealant to the interior of the seal cap mold or to the fastener or to both, wherein the uncured sealant is translucent; n) positioning the seal cap mold over the fastener such that at least a portion of the fastener resides in the interior of the seal cap mold; and o) curing the sealant by application of actinic radiation to the sealant through the seal cap mold. In some embodiments, the fastener protrudes from a first surface of a substrate article and, following steps m), n) and o), every portion of the fastener which protrudes from the first surface of the substrate article is covered by sealant.

In another aspect, the present disclosure provides a protected fastener construction comprising: q) a fastener; r) a seal cap which defines an interior; and s) a cured sealant; wherein the seal cap is optically translucent, wherein the seal cap is positioned over the fastener such that at least a portion of the fastener resides in the interior of the seal cap; and wherein the interior of the seal cap additionally contains the cured sealant which binds the seal cap to the fastener. In some embodiments the fastener protrudes from a first surface of a substrate article and wherein every portion of the fastener which protrudes from the first surface of the substrate article is covered by cured sealant or seal cap or both. In some embodiments the first surface is an interior surface of a fuel container of an aircraft.

In another aspect, the present disclosure provides a protected fastener construction comprising: t) a fastener; and u) a shaped cured sealant; wherein the cured sealant is shaped to form a seal cap; wherein the shaped cured sealant is optically translucent, wherein the shaped cured sealant is positioned over and encloses at least a portion of the fastener, wherein the shaped cured sealant is bound to the fastener. In some embodiments the fastener protrudes from a first surface of a substrate article and wherein every portion of the fastener which protrudes from the first surface of the substrate article is covered by cured sealant or seal cap or both. In some embodiments the first surface is an interior surface of a fuel container of an aircraft.

In another aspect, the present disclosure provides an application-ready seal cap comprising: v) a seal cap which defines an interior; and w) a quantity of an uncured sealant; wherein the seal cap is optically translucent, and wherein the interior of the seal cap contains the quantity of uncured sealant.

In some embodiments of the methods or articles of the present disclosure, the seal cap is optically translucent. In some embodiments of the methods or articles of the present disclosure, the seal cap is visibly transparent. In some embodiments of the methods or articles of the present disclosure, the seal cap comprises a polyurethane polymer. In some embodiments of the methods or articles of the present disclosure, the seal cap comprises a polythioether polymer. In some embodiments of the methods or articles of the present disclosure, the seal cap comprises a THV polymer. In some embodiments of the methods or articles of the present disclosure, the seal cap comprises a mixture of a polymer and a nanoparticulate curative.

In some embodiments of the methods or articles of the present disclosure, the sealant is optically translucent. In some embodiments of the methods or articles of the present disclosure, the sealant is visibly transparent. In some embodiments of the methods or articles of the present disclosure, the sealant comprises a polyurethane polymer. In some embodiments of the methods or articles of the present disclosure, the sealant comprises a polythioether polymer. In some embodiments of the methods or articles of the present disclosure, the sealant comprises a polysulfide polymer. In some embodiments of the methods or articles of the present disclosure, the sealant comprises a mixture of a polymer and a nanoparticulate curative. In some embodiments of the methods or articles of the present disclosure, the sealant cures to form a material that is optically translucent. In some embodiments of the methods or articles of the present disclosure, the sealant cures to form a material that is visibly transparent.

In some embodiments of the methods or articles of the present disclosure, the seal cap and sealant comprise different materials.

DETAILED DESCRIPTION

Figure 1A:
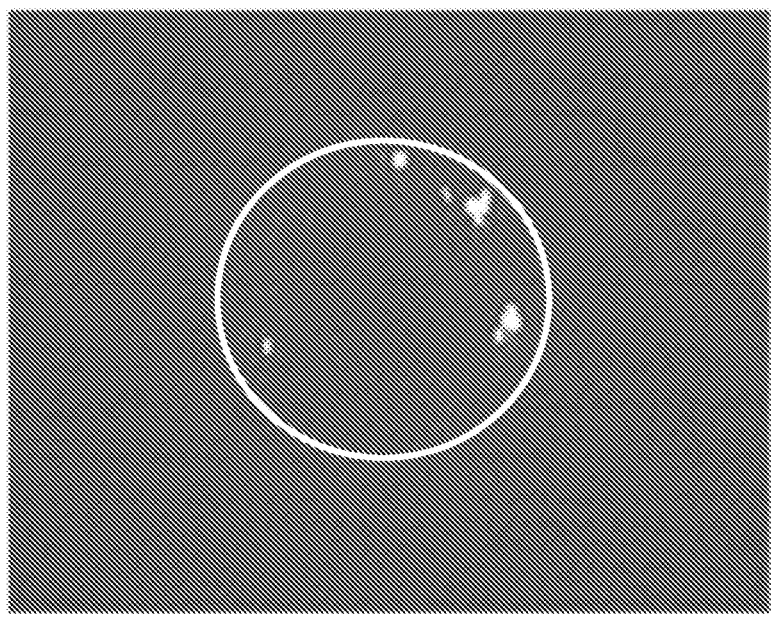
FIGS. 1a-1d are photographs taken during a lightning strike test as described in the present Examples, at Example 18, test number 2. The photographs are modified by the addition of a white circle to mark the outside edge of the seal cap.
Figure 1B:
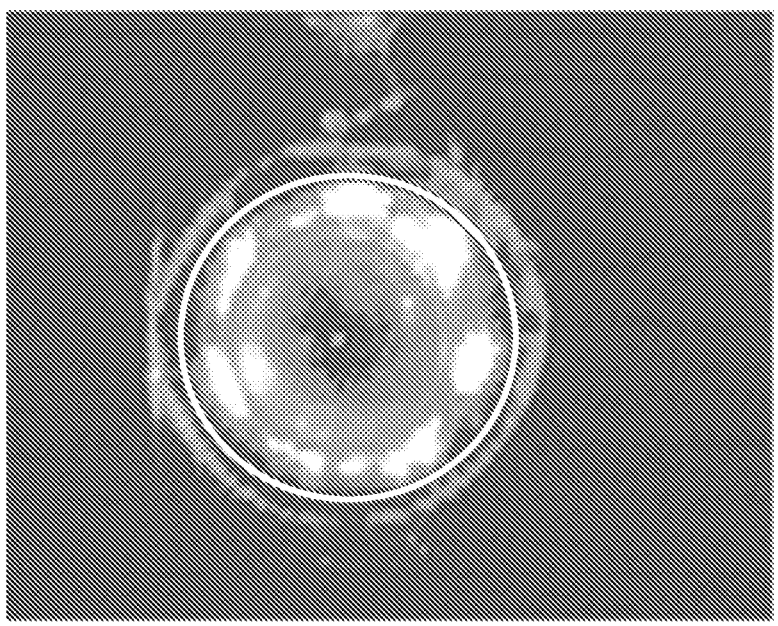
Figure 1C:
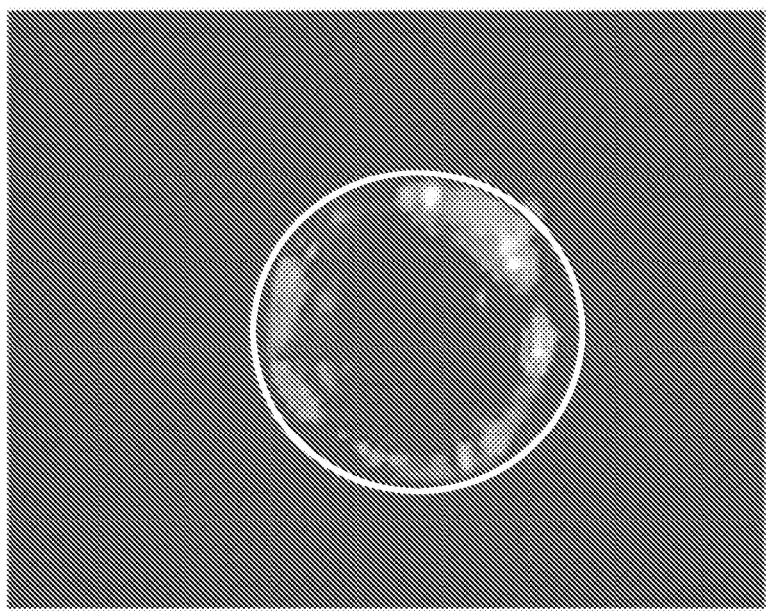
Figure 1D:
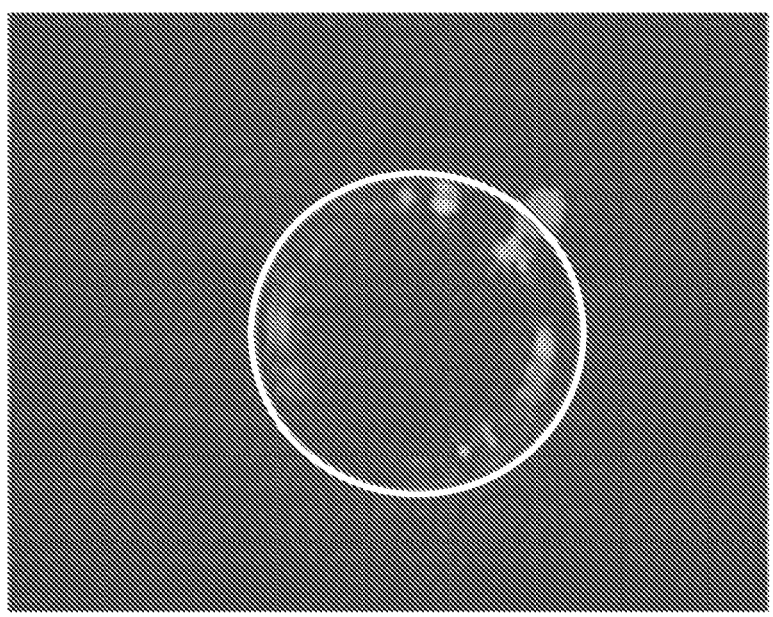
Figure 2A:
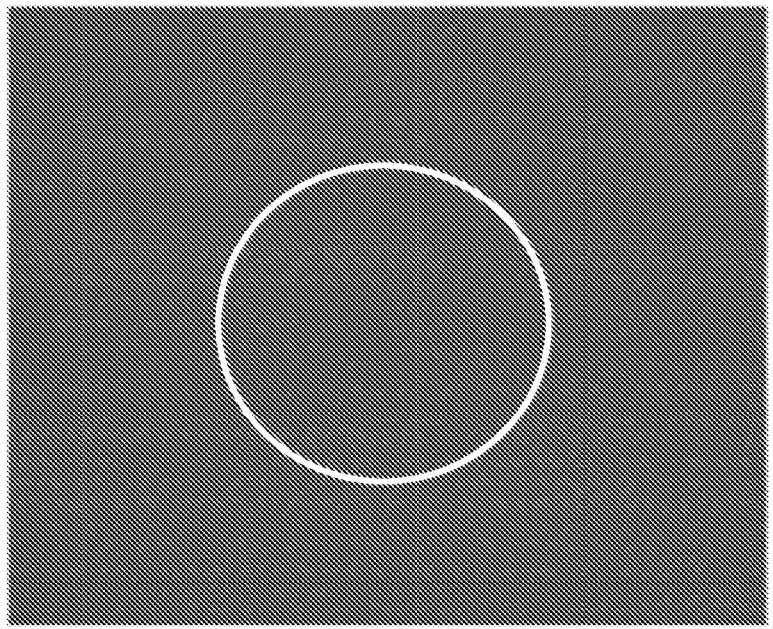
FIGS. 2a-2d are photographs taken during a lightning strike test as described in the present Examples, at Comparative E, test number 3. The photographs are modified by the addition of a white circle to mark the outside edge of the seal cap.
Figure 2B:
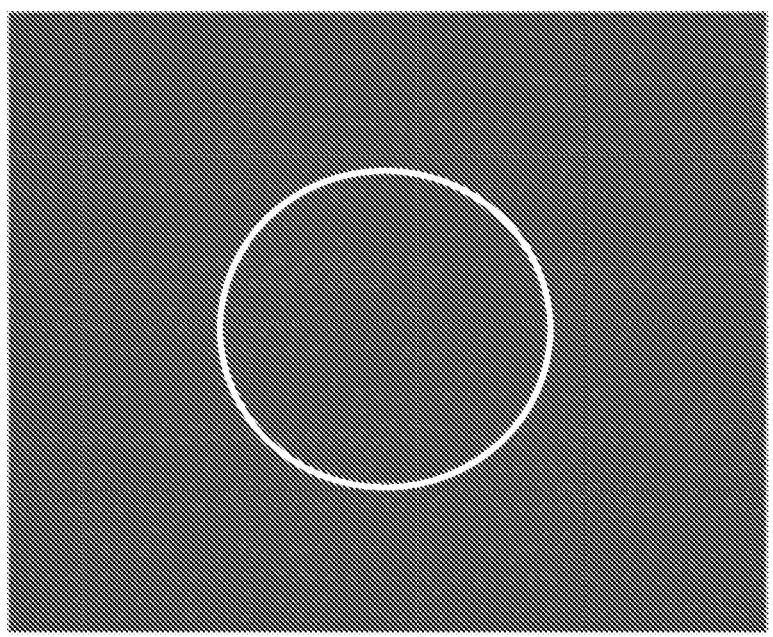
Figure 2C:
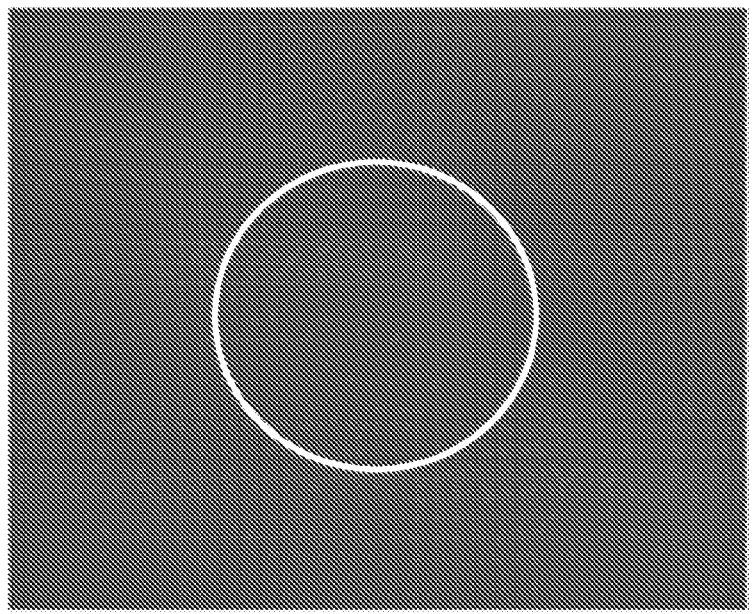
Figure 2D:
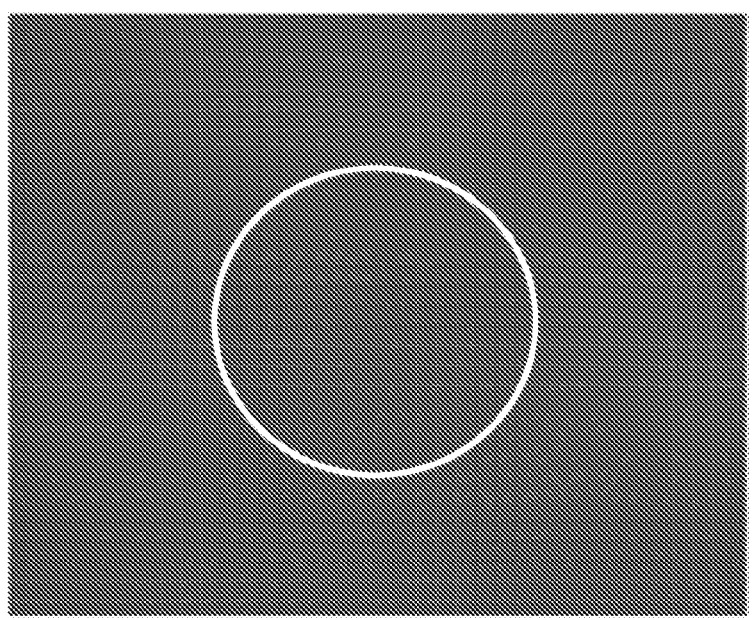
Figure 3:
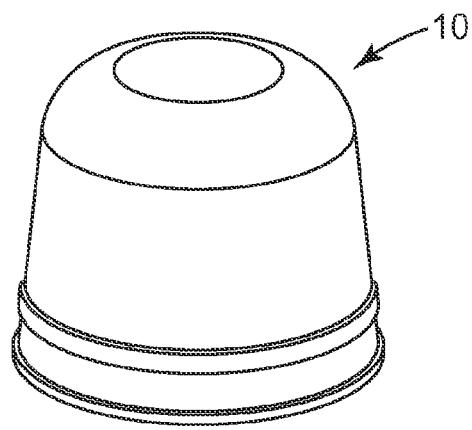
FIG. 3 is an embodiment of a seal cap according to the present invention.
Figure 4A:
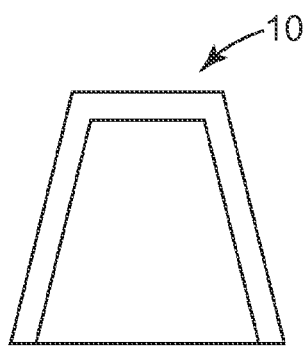
FIGS. 4a-4c are schematic representations of certain embodiments of seal caps according to the present invention.

The present disclosure provides seal caps, methods of their use, and constructions comprising seal caps. In machine construction using rivets, bolts, and other types of fasteners, it may be beneficial to apply a sealant to the exposed portion of the fasteners to protect them from corrosion and to provide electrical insulation. The sealant may also function as a barrier to the passage of fluids, particularly where the fastener protrudes into a fluid containment tank, particularly where that fluid is fuel, and most particularly where that tank is on board an aircraft. In such cases, the fastener may also function to prevent or reduce passage of electrical discharge, such as from a lightning strike, into the interior of a fuel tank. The seal caps according to the present disclosure may be useful in sealing fasteners in many such applications. FIGS. 3 and 4a each represent an embodiment of a seal cap 10 according to the present invention.

In some embodiments, the seal caps according to the present invention are translucent. As used herein, the term "translucent" means able to transmit some portion of visible light, typically greater than 20% of light in the 360-750 nm wavelength range, in some embodiments greater than 30%, in some embodiments greater than 40%, and in some embodiments greater than 50%. In some embodiments, the seal caps according to the present invention are optically transparent, meaning transparent to the extent that the article does not prevent a viewer from resolving an image, e.g., reading text. In some embodiments, seal caps according to the present invention permit visual inspection for flaws in construction or installation or both.

In some embodiments, the seal caps according to the present invention are made of a material having a dielectric breakdown strength of greater than 1.0 kV/mm, in some embodiments greater than 5.0 kV/mm, in some embodiments greater than 10.0 kV/mm, in some embodiments greater than 15.0 kV/mm, in some embodiments greater than 30.0 kV/mm, in some embodiments greater than 40.0 kV/mm, and in some embodiments greater than 50.0 kV/mm. In some embodiments, the use of a material having a higher dielectric breakdown strength permits the manufacture of a lighter seal cap.

In some embodiments, the seal caps according to the present invention are thin-walled. In some embodiments, the seal caps have an average wall thickness of less than 1.5 mm, in some embodiments less than 1.2 mm, in some embodiments less than 1.0 mm, in some embodiments less than 0.5 mm, in some embodiments less than 0.2 mm, in some embodiments less than 0.1 mm, and in some embodiments less than 0.08 mm.

The seal caps may be made of any suitable material. In some embodiments, the material is jet fuel resistant. In some embodiments, the material has a TB (brittle temperature) below −20° C. In some embodiments, the seal cap comprises a polyurethane polymer. In some embodiments, the seal cap comprises a polythioether polymer. In some embodiments, the seal cap comprises a polysulfide polymer. In some embodiments, the seal cap comprises a fluorinated thermoplastic polymer. In some embodiments, the seal cap comprises a THV polymer. In some embodiments, the seal cap comprises a fluorinated thermoset polymer. In some embodiments, the seal cap comprises a engineering thermoplastic. In some embodiments, the seal cap comprises a PEEK polymer. In some embodiments, the seal cap comprises a mixture of a polymer and a nanoparticulate filler. In some embodiments, the seal cap comprises a mixture of a polymer and a nanoparticulate curative. In some embodiments, the seal cap comprises no fillers or other particulates having an average particle size greater than 10 nm, in some embodiments not greater than 5 nm, and in some embodiments not greater than 1 nm.

In some embodiments, the seal cap and sealant comprise different materials. In some embodiments, the seal cap and sealant do not comprise different materials.

Figure 4B:
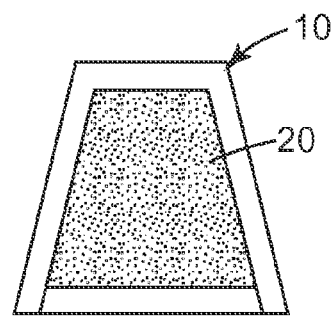

In some embodiments, the seal cap is at least partially filled with sealant. With reference to FIG. 4b, seal cap 10 may be filled with sealant 20. In some embodiments, the seal cap is at least partially filled with sealant shortly before use. In some embodiments, the seal cap is at least partially filled with sealant and stored in ready-to-use form. In some such embodiments, a filled or partially filled cap is stored at low temperature. In some such embodiments, the filled or partially filled cap must be thawed before use. In some embodiments, the seal cap is at least partially filled with sealant prior to application to a fastener. In some embodiments, the seal cap is at least partially filled with sealant after application to a fastener, e.g., by syringe, by a sealant port, or the like. In some embodiments, the seal cap is applied to a fastener after application of sealant to the fastener. In some embodiments, the fastener penetrates a substrate article. In some embodiments, the fastener protrudes from a surface of a substrate article. In some embodiments the substrate article is a composite material. In some embodiments, the substrate article is a epoxy matrix and glass or carbon fiber composite material. In some embodiments, every portion of the fastener which protrudes from the substrate article is covered by cured sealant or seal cap or both. In some embodiments, every portion of the fastener which protrudes from the substrate article is covered by cured sealant.

Figure 4C:
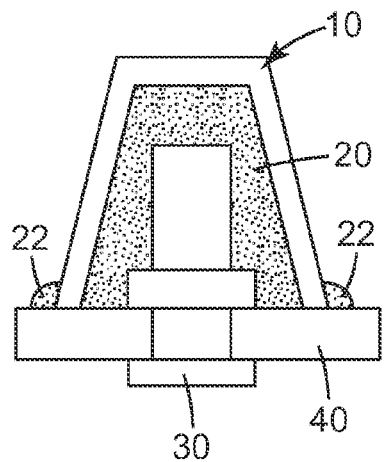

With reference to FIG. 4c, in one embodiment, seal cap 10 filled with sealant 20 covers fastener 30 which protrudes from substrate article 40. Some excess amount of sealant 22 may be pressed out of seal cap 10 during application.

The sealant may be any suitable material. In some embodiments, the material is jet fuel resistant. In some embodiments, the material has a TB (brittle temperature) below −20° C. In some embodiments, the sealant comprises a polyurethane polymer. In some embodiments, the sealant comprises a polythioether polymer. In some embodiments, the sealant comprises a polysulfide polymer. In some embodiments, the sealant comprises a mixture of a polymer and a nanoparticulate filler. In some embodiments, the sealant comprises a mixture of a polymer and a nanoparticulate curative. In some embodiments, the seal cap comprises no fillers or other particulates having an average particle size greater than 10 nm, in some embodiments not greater than 5 nm, and in some embodiments not greater than 1 nm.

The seal cap material and sealant material may be chosen such that strong bonds are formed between the sealant and the seal cap. The sealant material may be chosen such that strong bonds are formed between the sealant and the substrate. Optionally, the sealant material may be chosen such that strong bonds are formed between the sealant and the fastener.

After application of seal cap and sealant to a fastener the sealant is typically cured. In some embodiments, the sealant is a radiation cured sealant. In some embodiments, the sealant is cured by application of actinic radiation to the sealant. In some embodiments, the sealant is cured by application of green light to the sealant. In some embodiments, the sealant is cured by application of blue light to the sealant. In some embodiments, the sealant is cured by application of violet light to the sealant. In some embodiments, the sealant is cured by application of UV light to the sealant. In some embodiments, the sealant is cured by application of radiation to the sealant through a translucent seal cap. In some embodiments, the sealant is substantially fully cured in less than 60 seconds, in some embodiments less than 30 seconds, and in some embodiments less than 10 seconds. In some embodiments, cure is accomplished by addition of a curing agent shortly prior to use. In some embodiments, cure is accomplished by heat cure at ambient conditions. In some embodiments, cure is accomplished by heat cure by application of heat from a heat source.

In some embodiments, a combination seal and seal cap is molded in place over a fastener using a seal cap mold. In some embodiments, the seal cap mold is translucent or transparent to allow inspection and radiation cure of the form-in place seal and seal cap.

Figure 5A:
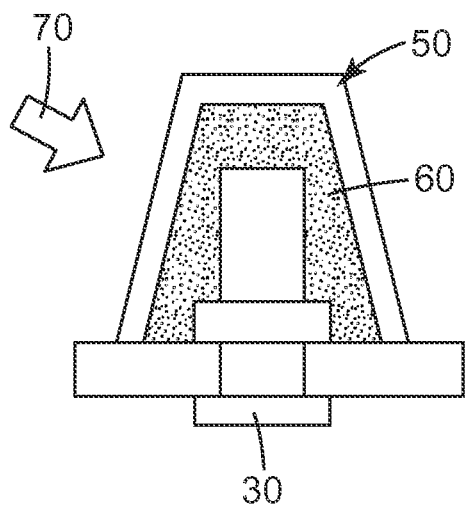
FIG. 5a is a schematic representation of an embodiment of a step in a process for making a sealed fastener according to the present invention.
Figure 5B:
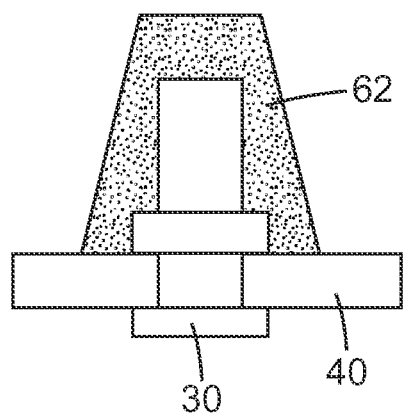
FIG. 5b is a schematic representation of one embodiment of a sealed fastener according to the present invention.

FIG. 5a depicts one embodiment of such a process, wherein seal cap mold 50 containing sealant 60 is located over fastener 30 which protrudes from substrate article 40. In this embodiment, sealant 60 is cured by application of radiation 70. FIG. 5b depicts the completed seal 62 after removal of seal cap mold 50.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.
The following abbreviations are used to describe the examples:
° C.: degrees Centigrade
cm: centimeter
kA: kilo amps
kPa: kilo Pascals
LED: light emitting diode
mL: milliliter mm: millimeter
m: micrometer
nm: nanometer
Pa·s: Pascal·second
psi: pounds per square inch
$T_g$: glass transition temperature
UV: ultraviolet
Materials.
Abbreviations for the materials used in the examples are as follows:
A-200: A hydrophilic fumed silica, obtained under the trade designation "AEROSIL 200" from Evonik Industries AG, Essen, Germany.
AC-240: A gray two-part polysulfide-based sealant, having a cured specific gravity of 1.61, obtained under the trade designation "AEROSPACE SEALANT AC-240 CLASS B" from 3M Company, St. Paul, Minn.
AC-360: A brown two-part polysulfide-based sealant, having a cured specific gravity of 1.40, obtained under the trade designation "AEROSPACE SEALANT AC-360 CLASS B" from 3M Company.
AC-380: A gray two-part polysulfide-based sealant, having a cured specific gravity of 1.10, obtained under the trade designation "AEROSPACE SEALANT AC-380 CLASS B" from 3M Company.
APTIV: A 2-mil (50.8 m) unfilled semi-crystalline polyetheretherketone (PEEK) film, obtained under the trade designation "APTIV 1000-050G" from Victrex USA, Inc., West Conshohocken, Pa.
DABCO-33LV: A solution of 33% triethylenediamine and 67% dipropylene glycol, obtained under the trade designation "DABCO-33LV" from Air Products & Chemicals, Inc., Allentown, Pa.
DEN-431: A semi-solid reaction product of epichlorohydrin and phenol-formaldehyde novolac, obtained under the trade designation "D.E.N. 431" from Dow Chemical Company, Midland, Mich.
DMDO: 1,8-Dimercapto-3,6-dioxaoctane, obtained from Arkena, Inc., King of Prussia, Pa.
DSW: An aluminosilicate clay, obtained under the trade designation "DRAGONITE SELECT WHITE" from Applied Minerals, Inc., New York, N.Y.
DVE-2: Diethyleneglycol divinylether, obtained from BASF Corp., Florham Park, N.J.
DVE-3: Triethyleneglycol divinylether, obtained under the trade designation "RAPI-CURE DVE-3" from Ashland Specialty Ingredients, Wilmington, Del.
E-8220: A diglycidylether of bisphenol F, obtained under the trade designation "EPALLOY 8220" from Emerald Performance Materials, LLC, Cuyahoga Falls, Ohio.
E-8240: A very low viscosity epoxy phenol novolac resin, obtained under the trade designation "EPALLOY 8240" from Emerald Performance Materials, LLC.
GE-30: Trimethylolpropane triglycidylether, obtained under the trade designation "ERISYS GE-30" from Emerald Performance Materials Company.
I-819: Phenylbis(2,4,6-trimethylbenzoyl)phosphine Oxide, obtained under the trade designation "IRGACURE 819" from BASF Corp., Florham Park, N.J.
LP-33: A liquid polysulfide polymer, obtained under the trade designation "THIOKOL LP-33" from Toray Fine Chemicals Co., Ltd., Urayasu, Japan.
MEK: Methyl ethyl ketone.
NCC: Nanoparticle (70-100 nm) calcium carbonate, obtained under the trade designation "SOCAL 31" from Solvay Chemicals, Inc., Houston, Tex.

ODY: 1,7-octadiyne, obtained from ChemSampCo, Inc., Trenton, N.J.

PR-1776: A brown two-part polysulfide-based sealant, having a cured specific gravity of 1.29, obtained under the trade designation "PR-1776M CLASS B LOW WEIGHT FUEL TANK SEALANT" from PPG Aerospace/PRC-Desoto International, Inc., Sylmar, Calif.

TAC: Triallylcyanurate, obtained from Sartomer, Inc., Exton, Pa.

THV-200: A colorless transparent fluoroelastomer, obtained under the trade designation "THV 200" from 3M Company.

THV-200W: White pigmented THV 200, meeting the specifications for Federal Standard 595B, Color #17529 from 3M Company.

THV-500: A colorless fluoroelastomer, obtained under the trade designation "THV 500" from 3M Company.

VAZO-67: 2,2'-azobis(2-methylbutyronitrile), obtained under the trade designation "VAZO-67" from E.I. du Dupont de Nemours and Company, Wilmington, Del.

Liquid Polythioether Polymer 1 (PTE-1)

Into a 1000-ml round bottom flask equipped with an air-driven stirrer, thermometer, and a dropping funnel, was added 392.14 grams (2.15 moles) DMDO and 82.23 gram (0.25 mole) Epalloy 8220; 0.15 g DABCO (0.03 weight percent) was mixed in as a catalyst. The system was flushed with nitrogen, then mixed and heated for four hours at 60-70° C. 12.5 g (0.05 mole) of triallylcyanurate was added along with approximate 0.15 g Vazo 67. The material is mixed and heated at approximately 60° C. for 30-45 minutes. 313.13 g (1.55 moles) DVE-3 was then added dropwise to the flask over 45 minutes, keeping the temperature between 68-80° C. Vazo 67 is added in approximately 0.15 g units over approximately 6 hours for a total of 0.4-0.6 g. The temperature is raised to 100° C. and the material degassed for approximately 10 minutes. The resultant polythioether is approximately 3200 MW with 2.2 functionality.

Liquid Polythioether Polymer 2 (PTE-2).

A liquid polythioether polymer was prepared as follows: Into a 1-liter round bottom flask equipped with an air driven stirrer, thermometer, and a dropping funnel, was added 407.4 grams (2.24 moles) DMDO, 12.63 grams (0.05 moles) TAC and 0.1 grams of VAZO-67. This mixture was stirred at 60° C. for approximately 45 minutes. To this mixture, 380 grams (1.88 moles) DVE-3 was added drop wise over 45 minutes. Additional 0.3 grams VAZO-67 was added in small increments and the mixture heated at 70-80° C. for about 6 hours, followed by 10 minutes of vacuum degassing at 100° C. The resulting liquid polythioether polymer had a $T_g$ of less than −40° C., a viscosity of 100 Poise (10 Pa·s) and a thiol equivalent weight of 1,291 grams/equivalent.

Test Methods

Composite Test Panels.

Composite panels for lighting strike testing and seal cap installation were made using the follow materials and methods. Ten layers of unidirectional pre-preg, type "P2353W-19-30S", obtained from Toray Composites (America), Inc., Tacoma, Wash., were oriented 45,135,0,90,0,0,90,0,135,45 to give a balanced structure. A layer of woven graphite fabric, type "CYCOM 970/PWC T300 3K NT" from Cytec Industries, Inc., Woodland Park, N.J. was placed on each side of the 10-ply stack of pre-preg. The panel's size was nominally 12 by 12 inches (30.48 by 30.48 cm). The lay-up was then bagged using standard autoclave bagging practices and cured in an autoclave at 90 psi (620.5 kPa) under full vacuum at 350° F. (176.7° C.) for 2 hours. The panels were then cut in half and match drilled with ten holes to take Hi-Shear fastener shanks, Part No. "HL10VAZ6-3", obtained from Peerless Aerospace Fastener Co., Farmington, N.Y. The panels were drilled such that there was an overlap of 1 inch (2.54 cm) with the fasteners uniformly spaced along the center of the overlap joint. The two panels halves were joined together using the above mentioned shank and collar assembly, Part No. "HL94W6", also from Peerless Aerospace Fastener Co. The joint was wetted with AC-240 placed between the two panels and into the holes before tightening the fasteners. The final test panel had 10 fasteners centrally located in the overlap joint spaced uniformly across its 10 inch (25.4 cm) width.

Lightning Strike Test.

Composite panels having test fasteners covered with seal caps of the present invention was electrically grounded at the ends opposite the overlap joint. The cap side of the panel was placed inside a dark box, with a high speed camera positioned to record the event. The electrode was positioned 1.0 inches (2.54 cm) distant from the panel and directly opposite the target fastener on the outside of the dark box. An igniter wire was used to direct the arc to attach to the target fastener. 21 kA to 103 kA peak amplitude was imposed as the "D" bank component as described in SAE ARP1512. The "B" and "C" components were not used for this test. Various voltages were applied for each test and recorded. The pass fail for the tests was based on observed light in the dark box around the fastener.

Optical Transmission.

Optical transmission was used to measure the opacity of the cured seal caps. A bench top colorimeter, model "COLOR I" obtained from X-Rite, Inc., Grand Rapids, Mich., with a measuring range of 750-360 nm in 10 nm increments, used the full frequency sweep and averaged to give a single value for percent transmission. An appropriate aperture was selected in the machine to give the maximum area for transmission while being able to hold the cap in the aperture. The equipment was calibrated using standard methods. The output from the test is a transmission value for each frequency from 360 nm to 750 nm. Table 2 shows the data as an average of the 360-750 nm frequency range. Subjective observations were also made for color and opacity, with opacity being evaluated on the basis of how well a pencil, placed inside the cap could be observed through the side wall of the cap. As reported herein, clear samples have a transmissivity greater than approximately 50% and translucent samples have a transmissivity greater than approximately 20%.

Translucent Seal Cap Examples

Example 1

Translucent polyurethane seal caps were prepared as follows: A Shore 80 polyurethane casting compound, obtained under the trade designation "SMOOTH-ON CRYSTAL CLEAR 200" from McMaster-Carr Supply Company, Elmhurst, Ill., was then poured into the female tool of a 6 by 8 inch (15.24 by 20.32 cm) 4-cavity stainless-steel seal cap mold, the cavities were designed to give a frusto-conical shaped cap with a base diameter of 27 mm a height of 23 mm and a wall thickness of 2.5 mm. The male tool closed the mold and the casting compound cured at 70° F. (21.1° C.) for 24 hours. The resulting translucent seal cap was then removed from the tool.

Example 2

Translucent polythioether seal caps were prepared as follows: 100 grams PTE-1 was homogeneously mixed with 6.78 grams GE-30, 4.52 grams E-8220 and 1.00 grams DABCO-33LV. Part of this mixture was then poured into the female tool of the 6 by 8 inch (15.24 by 20.32 cm) 4-cavity stainless-steel seal cap mold. The male tool closed the mold and the mixture cured for 6 hours at 60° C. The resulting translucent seal cap was then removed from the tool.

Example 3

Translucent polythioether seal caps were prepared as follows: 100 grams PTE-2 was homogeneously mixed with 6.78 grams GE-30, 4.52 grams E-8220 and 1.00 gram DABCO-33LV. Part of this mixture was then poured into the female tool of an 8 by 8 inch (20.32 by 20.32 cm) 9-cavity aluminum seal cap mold, the cavities were designed to give a frusto-conical shaped cap with a base diameter of 15 mm a height of 15 mm and a wall thickness of 2.5 mm. The male tool closed the mold and the mixture cured for 3 hours at 75° F. (23.9° C.), followed by 1 hour at 130° F. (54.4° C.), after which the mold was cooled to 70° F. (21.1° C.) before opening. The resulting translucent seal cap was then removed from the tool.

Example 4

The process generally described in Example 3 was repeated, wherein the polymer mixture was allowed to pre-react for 2 hours before closing the mold and curing. The resulting translucent seal cap was then removed from the tool.

Example 5

A 40 mL amber glass vial was charged with 7.055 grams DMDO, 5.252 grams DVE-2 and 0.914 grams TAC at 21° C. To this was added 0.132 grams 1-819. The vial was then sealed and placed on a laboratory roller mill for 10 minutes until the 1-819 had dissolved. The curable composition was injected into the female tool of the 8 by 8 inch (20.32 by 20.32 cm) 9-cavity aluminum seal cap mold, and a clear epoxy male tool was used to close the mold. The mixture was then cured by exposure, through the male tool, to a 455 nm LED light source, model "CF 2000" from Clearstone Technologies, Inc., Minneapolis, Minn., for 1 minute at a distance of 0.2 inches (0.51 cm). The resulting translucent seal cap was then removed from the tool.

Example 6

A 50:50 by weight mixture of THV-200 and MEK was brushed onto a single impression male tool dimensioned to give a frusto-conical shaped cap with a base diameter of 10 mm and a height of 10 mm and allowed to dry at 70° F. (21.1° C.) for approximately 60 minutes. A second application of the fluoroelastomer solution was applied to the male tool and again allowed to dry giving a wall thickness of about 0.25 mm. The resulting light weight translucent seal cap was then removed from the tool and trimmed Example 7

A curable polythioether composition was prepared as follows. A 40 mL amber glass vial was charged with 7.000 grams DMDO, 4.349 grams DVE-2 and 1.812 grams TAC at 21° C. To this was added 0.132 grams 1-819. The vial was then sealed and placed on a laboratory roller mill for 10 minutes until the 1-819 had dissolved. A UV curable seal cap was made as follows. The curable composition was injected into the female tool of the 8 by 8 inch (20.32 by 20.32 cm) 9-cavity aluminum seal cap mold. A clear epoxy male tool was then used to close the mold and the composition cured by exposure, through the male tool, to the 455 nm LED for 1 minute at a distance of 0.2 inches (0.51 cm). The resulting translucent seal cap was then removed from the tool.

Example 8

A curable polythioether composition was prepared as generally described in Example 7, wherein after the resin and initiator were dissolved, 1.329 grams A-200 was homogeneously dispersed in the composition by means of a high speed mixer for 1 minute. A UV curable seal cap was made as follows. The curable composition was injected into the female tool of the 8 by 8 inch (20.32 by 20.32 cm) 9-cavity aluminum seal cap mold. A clear epoxy male tool was then used to close the mold and the composition cured by exposure, through the male tool, to the 455 nm LED for 1 minute at a distance of 0.2 inches (0.51 cm). The resulting translucent seal cap was then removed from the tool.

Example 9

A curable polythioether composition was prepared as generally described in Example 7, wherein after the resin and initiator were dissolved, 1.329 grams DSW was homogeneously dispersed in the composition by means of a high speed mixer for 1 minute. A UV curable seal cap was made as follows. The curable composition was injected into the female tool of the 8 by 8 inch (20.32 by 20.32 cm) 9-cavity aluminum seal cap mold. A clear epoxy male tool was then used to close the mold and the composition cured by exposure, through the male tool, to the 455 nm LED for 1 minute at a distance of 0.2 inches (0.51 cm). The finished cap was removed from the tool providing a translucent seal cap.

Example 10

A curable polythioether composition was prepared as generally described in Example 9, wherein the amount of DSW was increased to 2.659 grams. A UV curable seal cap was made as follows. The curable composition was injected into the female tool of the 8 by 8 inch (20.32 by 20.32 cm) 9-cavity aluminum seal cap mold. A clear epoxy male tool was then used to close the mold and the composition cured by exposure, through the male tool, to the 455 nm LED for 1 minute at a distance of 0.2 inches (0.51 cm). The resulting translucent seal cap was then removed from the tool.

Example 11

A curable polythioether composition was prepared as generally described in Example 9, wherein the amount of DSW was increased to 3.988 grams. A UV curable seal cap was made as follows. The curable composition was injected into the female tool of the 8 by 8 inch (20.32 by 20.32 cm) 9-cavity aluminum seal cap mold. A clear epoxy male tool was then used to close the mold and the composition cured by exposure, through the male tool, to the 455 nm LED for 1 minute at a distance of 0.2 inches (0.51 cm). The resulting translucent seal cap was then removed from the tool.

Example 12

A curable polythioether composition was prepared as follows. A 40 mL amber glass vial was charged with 7.000 grams DMDO, 5.212 grams DVE-2 and 0.289 grams ODY at 21° C. To this was added 0.125 grams 1-819. The vial was then sealed and placed on a laboratory roller mill for 10 minutes until the 1-819 had dissolved. The curable composition was injected into the female tool of the 8 by 8 inch (20.32 by 20.32 cm) 9-cavity aluminum seal cap mold. A clear epoxy male tool was then used to close the mold and the composition cured by exposure, through the male tool, to the 455 nm LED for 1 minute at a distance of 0.2 inches (0.51 cm). The resulting translucent seal cap was then removed from the tool.

Example 13

15 grams LP-33 was mixed with 4.53 grams E-8240 in an open vessel at 21° C. Approximately 0.05 grams DABCO-33LV was added and the mixture was degassed under vacuum. Part of this mixture was then poured into the 6 by 8 inch (15.24 by 20.32 cm) 4-cavity stainless-steel seal cap mold, the male tool closed the mold and the mixture cured for 1 hour at 140° F. The tool was allowed to cool and the resulting translucent seal cap was then removed from the tool.

Example 14

A curable polythioether composition was prepared as generally described in Example 7, wherein after the resin and initiator were dissolved, 1.329 grams NCC was homogeneously dispersed in the composition by means of a high speed mixer for 1 minute. A UV curable seal cap was made as follows. The curable composition was injected into the female tool of the 8 by 8 inch (20.32 by 20.32 cm) 9-cavity aluminum seal cap mold. A clear epoxy male tool was then used to close the mold and the composition cured by exposure, through the male tool, to the 455 nm LED for 1 minute at a distance of 0.2 inches (0.51 cm). The resulting translucent seal cap was then removed from the tool.

Opaque Seal Cap Comparatives

Comparative A

AC-380 sealant mixture was prepared in a 10:1 base: accelerator weight ratio at 70° F. (21.1° C.) and injected into the female tooling of the 8 by 8 inch (20.32 by 20.32 cm) 9-cavity aluminum seal cap mold. The male tooling closed the mold and the sealant cured for approximately 12 hours at 75° F. (23.9° C.), followed by 1 hour at 130° F. (54.4° C.), after which the mold was cooled to room temperature before opening and removing the opaque seal caps.

Comparative B

The general procedure as described in Comparative A was repeated, wherein the AC-380 was substituted with AC-360, resulting in an opaque seal cap.

Comparative C

The general procedure described in Comparative A was repeated, wherein AC-380 was substituted with PR-1776, resulting in an opaque seal cap.

Comparative D

A white fluorinated polymer film was prepared by feeding a uniform mixture of pellets having 97 weight percent THV-500 and 3 weight percent THV-200W into a 1.9 cm Haake extruder. The extruder was run to give a uniform 43 m film supported by a 127 um polyethylene backing film. The caps were made using a vacuum forming table. The unsupported THV film was positioned and clamped over the single impression male tool, on the vacuum table. The film was then heated to 400° F. (204.4° C.) using radiant heat. After the film started to sag the tool was driven up into the film and a vacuum applied to pull the film over the tool. The opaque film was allowed to cool to 21° C., removed from the male tool and trimmed, resulting in an opaque seal cap.

Filled Translucent Seal Caps Examples

Example 15

150.0 grams PTE-1 was homogeneously mixed with 17.60 grams DEN-431 and 1.68 grams DABCO-33LV at 21° C. Part of this mixture was then poured into a translucent polyurethane seal cap made according to Example 1. The filled seal cap assembly was placed onto a fastener on the composite panel and cured at 21° C. for 24 hours. This resulted in a fastener protected by a translucent cured seal cap.

Example 16

100.0 grams PTE-1 was homogeneously mixed with 6.78 grams GE-30, 4.52 grams E-8220 and 1.00 grams DABCO-33LV at 21° C. Part of this mixture was then poured into a translucent polythioether seal cap made according to Example 2. The filled seal cap assembly was placed onto a fastener on the composite panel and cured at 21° C. for 24 hours. This resulted in a fastener protected by a translucent cured seal cap.

Example 17

100.0 grams PTE-1 was homogeneously mixed with 6.78 grams GE-30, 4.52 grams E-8220 and 1.00 gram DABCO-33LV. Part of this mixture was then poured into a translucent polythioether seal cap made according to Example 2 and quickly frozen to below −20° C. The filled, frozen, seal cap was then stored at −40° C. for 30 days inside a package designed to protect the cap from atmospheric condensation. The cap was removed from the freezer and allowed to thaw to 21° C. while protected from atmospheric condensation. The filled seal cap assembly was then placed onto a fastener on the composite panel and cured at 21° C. for 24 hours. This resulted in a fastener protected by a translucent cured seal cap.

Example 18

A clear resin was made as follows. 100 grams PTE-2 was homogeneously mixed with 6.78 grams GE-30, 4.52 grams E-8220 and 1.00 gram DABCO-33LV at 21° C. Part of this mixture was then poured into a translucent polythioether seal cap made according to Example 3. The filled seal cap assembly was then placed onto a fastener on the composite panel and cured at 21° C. for 24 hours. This resulted in a fastener protected by a translucent cured seal cap.

Example 19

The translucent seal cap of Example 3 was filled with opaque resin AC-360. The filled seal cap assembly was then placed onto a fastener on the composite panel and cured at 21° C. for 24 hours. This resulted in a fastener protected by a translucent cured cap with an opaque internal sealant.

Example 20

A UV curable thiol-yne resin prepared as follows. A 40 mL amber glass vial was charged with 7.000 grams DMDO, 5.212 grams DVE-2 and 0.2894 grams ODY at 21° C. To this was added 0.125 grams 1-819. The vial was then sealed and placed on a laboratory roller mill for 10 minutes until the 1-819 had dissolved. Part of this mixture was then poured into a translucent seal cap made according to Example 5. The filled seal cap assembly was then placed onto a fastener on the composite panel and cured by exposure to the 455 nm LED for 30 seconds at a distance of approximately 1-inch (2.54 cm) from the composite panel. This resulted in a fastener protected by a translucent cured seal cap.

Example 21

A clear thiol-ene resin composition was prepared as follows. A 40 mL amber glass vial was charged with 7.000 grams DMDO, 4.3494 grams DVE-2 and 1.8124 grams TAC at 21° C. To this was added 0.132 grams 1-819. The vial was then sealed and placed on a laboratory roller mill for 10 minutes until the 1-819 had dissolved. Part of this mixture was then poured into a translucent seal cap made according to Example 6. The filled seal cap assembly was then placed onto a fastener on the composite panel and cured by exposure to the 455 nm LED for 30 seconds at a distance of approximately 1-inch (2.54 cm) from the composite panel. This resulted in a fastener protected by a translucent cured seal cap.

Example 22

The translucent seal cap of Example 6 was filled with opaque resin AC-240. The filled seal cap assembly was then placed onto a fastener on the composite panel and cured at 21° C. for 24 hours. This resulted in a fastener protected by a translucent cured seal cap with an opaque sealant.

Example 23

A fastener protected by a translucent cured seal cap was made according to the general procedure described in Example 21, wherein the translucent seal cap Example 6 was substituted with a translucent seal cap made according to Example 3.

Example 24

A fastener protected by a translucent cured seal cap was prepared as generally described in Example 20, wherein the translucent seal cap made according to Example 5 was substituted with a translucent seal cap made according to Example 12.

One-Step Translucent Sealed Fastener

Example 25

A curable thiol-ene resin composition was prepared as follows. A 40 mL amber glass vial was charged with 7.000 grams DMDO, 4.439 grams DVE-2 and 1.812 grams TAC at 21° C. To this was added 0.132 grams 1-819. The vial was then sealed and placed on a laboratory roller mill for 10 minutes until the 1-819 had dissolved. The thiol-ene sealant formulation was injected into release coated, 13.5 mm diameter by 12 mm high, frusto-conical quartz glass cap mold. The cap was then placed onto a fastener on the composite panel and cured by exposure to the 455 nm LED for 30 seconds at a distance of approximately 1-inch (2.54 cm) from the composite panel. After curing the quartz glass cap mold was released, resulting in a fastener protected by a translucent cured seal cap.

Example 26

A fastener protected by a translucent cured seal cap was prepared as generally described in Example 25, wherein the thiol-ene chemistry was substituted by a thiol-yne chemistry as follows. Curable polythioether composition was prepared as follows. A 40 mL amber glass vial was charged with 7.000 grams DMDO, 5.212 grams DVE-2 and 0.2894 grams ODY at 21° C. To this was added 0.125 grams 1-819. The vial was then sealed and placed on a laboratory roller mill for 10 minutes until the 1-819 had dissolved.

Filled Opaque Seal Cap Comparative

Comparative E

The opaque seal cap of Comparative A was filled with opaque resin AC-380. The filled seal cap assembly was then placed onto a fastener on the composite panel and cured at 21° C. for 24 hours. This resulted in a fastener protected by an opaque cured seal cap with an opaque sealant.

Lightning strike tests and optical transmission of selected Examples and a Comparative are reported in Tables 1 and 2.

Example 27

A sheet of APTIV brand PEEK film was positioned over the single impression male tool that had been pre-heated to 200° C. The film was then softened and deformed over the male tool by means of a hot air gun. A pre-formed cap was then pressed over the softened film and male tool, after which the assembly was cooled to approximately 21° C. The pre-formed cap was then removed, revealing a light weight, translucent PEEK film cap, which was then removed from the male tool and trimmed Example 28

A filled translucent seal cap was prepared as generally described in Example 18, wherein the polythioether seal cap was replaced by a PEEK seal cap made according to Example 27.

FIGS. 1-2 are exemplary photographs of Examples 18, Test No. 2 and Comparative E, Test No. 3, respectively, of the lightning strike tests. With respect to Example 18, the translucent cap and translucent filler enabled observation of the plasma formation on the fastener inside the cap.

TABLE 1

| Example | Test # | Peak Current kA | Pass/Fail |
|---|---|---|---|
| Example 18 | 1 | 27 | Pass |
|  | 2 | 34 | Pass |
|  | 3 | 40 | Pass |

TABLE 1-continued

| Example | Test # | Peak Current kA | Pass/Fail |
|---|---|---|---|
| Example 19 | 1 | 28 | Pass |
| | 2 | 34 | Pass |
| Comparative E | 1 | 27 | Pass |
| | 2 | 28 | Pass |
| | 3 | 33 | Pass |

TABLE 2

| Example | Observed color | Subjective assessment of opacity | % Average Transmission (360-750 nm) |
|---|---|---|---|
| Control (Air) | | | 100.17 |
| Example 6 | Clear | Clear | 82.32 |
| Example 12 | Clear | Clear | 56.34 |
| Example 3 | light yellow tint | Clear | 53.00 |
| Example 7 | Clear | Clear | 51.81 |
| Example 5 | Clear | Clear | 51.24 |
| Example 9 | Milky white | Translucent | 46.40 |
| Example 8 | Milky white | Translucent | 44.42 |
| Example 10 | Milky white | Translucent | 33.76 |
| Example 11 | Milky white | Translucent | 23.70 |
| Example 14 | White | Opaque | 15.56 |
| Comparative D | White | Opaque | 11.96 |
| Comparative C | Black | Opaque | 0.93 |
| Comparative B | Black | Opaque | 0.42 |
| Comparative A | Black | Opaque | 0.40 |
| Control | Black Plate | Opaque | 0.01 |

FIG. 1 demonstrates a lightning strike test on Example 18; test number 2. The red circle on each photo shows the outside edge of the seal cap. The images progress from top left: the start of the strike, top right: full intensity plasma, discharge was contained within the cap, light outside the cap are reflections on other surfaces. Bottom left the plasma starting to decay and bottom right close to completion of the strike. FIG. 2 demonstrates a lightning strike test on Comparative E; test number 3. The images progress in the same sequence as Example 18 in FIG. 1. However, because the seal cap is opaque, the plasma discharge and decay cannot be observed.

The present disclosure includes following numbered list of illustrative embodiments:

1. A method of protecting a fastener comprising the steps of:
   a) providing a fastener;
   b) providing a seal cap which defines an interior, wherein the seal cap is optically translucent;
   c) applying an uncured sealant to the interior of the seal cap or to the fastener or to both; and
   d) positioning the seal cap over the fastener such that at least a portion of the fastener resides in the interior of the seal cap.

2. The method according to embodiment 1 wherein step c) is performed before step d).

3. The method according to embodiment 1 wherein step d) is performed before step c).

4. The method according to any of the preceding embodiments additionally comprising the step of:
   e) curing the sealant.

5. The method according to embodiment 4 wherein said step of curing the sealant comprises application of actinic radiation to the sealant through the seal cap.

6. The method according to embodiment 4 wherein said step of curing the sealant comprises application of blue, violet or UV light to the sealant through the seal cap.

7. The method according to any of embodiments 4-6 wherein the fastener protrudes from a first surface of a substrate article and wherein, following steps c), d) and e), every portion of the fastener which protrudes from the first surface of the substrate article is covered by cured sealant or seal cap or both.

8. A method of protecting a fastener comprising the steps of:
   f) providing a fastener;
   g) providing a seal cap which defines an interior, wherein the seal cap is optically translucent, and wherein the interior of the seal cap contains a quantity of an uncured sealant; and
   h) positioning the seal cap over the fastener such that at least a portion of the fastener resides in the interior of the seal cap.

9. The method according to embodiment 8 wherein the seal cap and uncured sealant recited in step g) are at a temperature of less than 5° C., and wherein the method additionally comprises the step of:
   i) warming the seal cap and uncured sealant to a temperature of at least 20° C.

10. The method according to any of embodiments 8-9 additionally comprising the step of:
    j) curing the sealant.

11. The method according to embodiment 10 wherein said step j) of curing the sealant comprises application of actinic radiation to the sealant through the seal cap.

12. The method according to embodiment 10 wherein said step j) of curing the sealant comprises application of blue, violet or UV light to the sealant through the seal cap.

13. The method according to any of embodiments 10-12 wherein the fastener protrudes from a first surface of a substrate article and wherein, following step j), every portion of the fastener which protrudes from the first surface of the substrate article is covered by cured sealant or seal cap or both.

14. The method according to embodiment 7 or embodiment 13 wherein said first surface is an interior surface of a fuel container.

15. The method according to embodiment 14 wherein said first surface is an interior surface of a fuel container of an aircraft.

16. The method according to any of embodiments 4-7 and 10-15 wherein the seal cap and cured sealant substantially prevent electrical arcing around the fastener.

17. The method according to any of embodiments 1-16 wherein the seal cap is translucent to the extent that the average light transmission through the cap in the 360-750 nm wavelength range is at least 20%.

18. The method according to any of embodiments 1-16 wherein the seal cap is translucent to the extent that the average light transmission through the cap in the 360-750 nm wavelength range is at least 30%.

19. The method according to any of embodiments 1-16 wherein the seal cap is translucent to the extent that the average light transmission through the cap in the 360-750 nm wavelength range is at least 40%.

20. The method according to any of embodiments 1-16 wherein the seal cap is translucent to the extent that the average light transmission through the cap in the 360-750 nm wavelength range is at least 50%.

21. The method according to any of the preceding embodiments wherein the seal cap is visibly transparent.

22. The method according to any of embodiments 1-21 wherein the seal cap comprises a polyurethane polymer.

23. The method according to any of embodiments 1-21 wherein the seal cap comprises a polythioether polymer.

24. The method according to any of embodiments 1-21 wherein the seal cap comprises a polysulfide polymer.

25. The method according to any of embodiments 1-21 wherein the seal cap comprises a fluorinated thermoplastic polymer.

26. The method according to any of embodiments 1-21 wherein the seal cap comprises a THV polymer.

27. The method according to any of embodiments 1-21 wherein the seal cap comprises a fluorinated thermoset polymer.

28. The method according to any of embodiments 1-21 wherein the seal cap comprises a engineering thermoplastic.

29. The method according to any of embodiments 1-21 wherein the seal cap comprises a PEEK polymer.

30. The method according to any of the preceding embodiments wherein the seal cap comprises a mixture of a polymer and a nanoparticulate filler.

31. The method according to any of the preceding embodiments wherein the seal cap comprises a mixture of a polymer and a nanoparticulate curative.

32. The method according to any of the preceding embodiments wherein the seal cap and sealant comprise different materials.

33. The method according to any of the preceding embodiments wherein the seal cap and sealant do not comprise different materials.

34. A method of protecting a fastener comprising the steps of:
  k) providing a fastener;
  l) providing a seal cap mold which defines an interior;
  m) applying an uncured sealant to the interior of the seal cap mold or to the fastener or to both, wherein the uncured sealant is translucent;
  n) positioning the seal cap mold over the fastener such that at least a portion of the fastener resides in the interior of the seal cap mold; and
  o) curing the sealant by application of actinic radiation to the sealant through the seal cap mold.

35. The method according to embodiment 26 wherein step m) is performed before step n).

36. The method according to embodiment 26 wherein step n) is performed before step m).

37. The method according to any of embodiments 34-36 wherein said step o) of curing the sealant comprises application of blue, violet or UV light to the sealant through the seal cap.

38. The method according to any of embodiments 26-30 additionally comprising the step of:
  p) removing the seal cap mold.

39. The method according to any of embodiments 34-38 wherein the fastener protrudes from a first surface of a substrate article and wherein, following steps m), n) and o), every portion of the fastener which protrudes from the first surface of the substrate article is covered by sealant.

40. The method according to embodiment 39 wherein said first surface is an interior surface of a fuel container.

41. The method according to embodiment 39 wherein said first surface is an interior surface of a fuel container of an aircraft.

42. The method according to any of embodiments 34-41 wherein the cured sealant substantially prevents electrical arcing around the fastener.

43. The method according to any of embodiments 1-33 wherein the uncured sealant is translucent.

44. The method according to any of embodiments 1-43 wherein the uncured sealant is translucent to the extent that the average light transmission through one millimeter of the uncured sealant in the 360-750 nm wavelength range is at least 20%.

45. The method according to any of embodiments 1-43 wherein the uncured sealant is translucent to the extent that the average light transmission through one millimeter of the uncured sealant in the 360-750 nm wavelength range is at least 50%.

46. The method according to any of embodiments 1-43 wherein the uncured sealant is visibly transparent.

47. The method according to any of embodiments 1-46 wherein the uncured sealant cures to form a material that is translucent.

48. The method according to any of embodiments 1-46 wherein the uncured sealant cures to form a material that is translucent to the extent that the average light transmission through one millimeter of the material in the 360-750 nm wavelength range is at least 20%.

49. The method according to any of embodiments 1-46 wherein the uncured sealant cures to form a material that is translucent to the extent that the average light transmission through one millimeter of the material in the 360-750 nm wavelength range is at least 50%.

50. The method according to any of embodiments 1-46 wherein the uncured sealant cures to form a material that is visibly transparent.

51. The method according to any of embodiments 1-50 wherein the sealant comprises a polyurethane polymer.

52. The method according to any of embodiments 1-50 wherein the sealant comprises a polythioether polymer.

53. The method according to any of embodiments 1-50 wherein the sealant comprises a polysulfide polymer.

54. The method according to any of the preceding embodiments wherein the sealant comprises a mixture of a polymer and a nanoparticulate filler.

55. The method according to any of the preceding embodiments wherein the sealant comprises a mixture of a polymer and a nanoparticulate curative.

56. A protected fastener construction comprising:
  q) a fastener;
  r) a seal cap which defines an interior; and
  s) a cured sealant;
wherein the seal cap is optically translucent,
wherein the seal cap is positioned over the fastener such that at least a portion of the fastener resides in the interior of the seal cap; and
wherein the interior of the seal cap additionally contains the cured sealant which binds the seal cap to the fastener.

57. The protected fastener construction according to embodiment 56 wherein the fastener protrudes from a first surface of a substrate article and wherein every portion of the fastener which protrudes from the first surface of the substrate article is covered by cured sealant or seal cap or both.

58. The protected fastener construction according to embodiment 57 wherein said first surface is an interior surface of a fuel container.

59. The protected fastener construction according to embodiment 57 wherein said first surface is an interior surface of a fuel container of an aircraft.

60. The protected fastener construction according to any of embodiments 56-59 wherein the seal cap and cured sealant substantially prevent electrical arcing around the fastener.

61. The protected fastener construction according to any of embodiments 56-60 wherein the seal cap is translucent to the extent that the average light transmission through the cap in the 360-750 nm wavelength range is at least 20%.

62. The protected fastener construction according to any of embodiments 56-60 wherein the seal cap is translucent to the extent that the average light transmission through the cap in the 360-750 nm wavelength range is at least 30%.
63. The protected fastener construction according to any of embodiments 56-60 wherein the seal cap is translucent to the extent that the average light transmission through the cap in the 360-750 nm wavelength range is at least 40%.
64. The protected fastener construction according to any of embodiments 56-60 wherein the seal cap is translucent to the extent that the average light transmission through the cap in the 360-750 nm wavelength range is at least 50%.
65. The protected fastener construction according to any of embodiments 56-64 wherein the seal cap is visibly transparent.
66. The protected fastener construction according to any of embodiments 56-65 wherein the seal cap comprises a polyurethane polymer.
67. The protected fastener construction according to any of embodiments 56-65 wherein the seal cap comprises a polythioether polymer.
68. The protected fastener construction according to any of embodiments 56-65 wherein the seal cap comprises a polysulfide polymer.
69. The protected fastener construction according to any of embodiments 56-65 wherein the seal cap comprises a fluorinated thermoplastic polymer.
70. The protected fastener construction according to any of embodiments 56-65 wherein the seal cap comprises a THV polymer.
71. The protected fastener construction according to any of embodiments 56-65 wherein the seal cap comprises a fluorinated thermoset polymer.
72. The protected fastener construction according to any of embodiments 56-65 wherein the seal cap comprises a engineering thermoplastic.
73. The protected fastener construction according to any of embodiments 56-65 wherein the seal cap comprises a PEEK polymer.
74. The protected fastener construction according to any of embodiments 56-73 wherein the seal cap comprises a mixture of a polymer and a nanoparticulate filler.
75. The protected fastener construction according to any of embodiments 56-74 wherein the seal cap comprises a mixture of a polymer and a nanoparticulate curative.
76. The protected fastener construction according to any of embodiments 56-75 wherein the seal cap and sealant comprise different materials.
77. The protected fastener construction according to any of embodiments 56-75 wherein the seal cap and sealant do not comprise different materials.
78. A protected fastener construction comprising:
  t) a fastener; and
  u) a shaped cured sealant;
wherein the cured sealant is shaped to form a seal cap;
wherein the shaped cured sealant is optically translucent,
wherein the shaped cured sealant is positioned over and encloses at least a portion of the fastener,
wherein the shaped cured sealant is bound to the fastener.
79. The protected fastener construction according to embodiment 78 wherein the fastener protrudes from a first surface of a substrate article and wherein every portion of the fastener which protrudes from the first surface of the substrate article is covered by cured sealant.
80. The protected fastener construction according to embodiment 79 wherein said first surface is an interior surface of a fuel container.
81. The protected fastener construction according to embodiment 79 wherein said first surface is an interior surface of a fuel container of an aircraft.
82. The protected fastener construction according to any of embodiments 78-81 wherein the cured sealant substantially prevents electrical arcing around the fastener.
83. The protected fastener construction according to any of embodiments 56-77 wherein the cured sealant is translucent.
84. The protected fastener construction according to any of embodiments 56-83 wherein the cured sealant is translucent to the extent that the average light transmission through one millimeter of the uncured sealant in the 360-750 nm wavelength range is at least 20%.
85. The protected fastener construction according to any of embodiments 56-83 wherein the cured sealant is translucent to the extent that the average light transmission through one millimeter of the uncured sealant in the 360-750 nm wavelength range is at least 50%.
86. The protected fastener construction according to any of embodiments 56-83 wherein the cured sealant is visibly transparent.
87. The protected fastener construction according to any of embodiments 56-86 wherein the sealant comprises a polyurethane polymer.
88. The protected fastener construction according to any of embodiments 56-86 wherein the sealant comprises a polythioether polymer.
89. The protected fastener construction according to any of embodiments 56-86 wherein the sealant comprises a polysulfide polymer.
90. The protected fastener construction according to any of embodiments 56-89 wherein the sealant comprises a mixture of a polymer and a nanoparticulate filler.
91. The protected fastener construction according to any of embodiments 56-89 wherein the sealant comprises a mixture of a polymer and a nanoparticulate curative.
92. An application-ready seal cap comprising:
  v) a seal cap which defines an interior; and
  w) a quantity of an uncured sealant;
wherein the seal cap is optically translucent, and
wherein the interior of the seal cap contains the quantity of uncured sealant.
93. The application-ready seal cap according to embodiment 92 wherein the seal cap is translucent to the extent that the average light transmission through the cap in the 360-750 nm wavelength range is at least 20%.
94. The application-ready seal cap according to embodiment 92 wherein the seal cap is translucent to the extent that the average light transmission through the cap in the 360-750 nm wavelength range is at least 30%.
95. The application-ready seal cap according to embodiment 92 wherein the seal cap is translucent to the extent that the average light transmission through the cap in the 360-750 nm wavelength range is at least 40%.
96. The application-ready seal cap according to embodiment 92 wherein the seal cap is translucent to the extent that the average light transmission through the cap in the 360-750 nm wavelength range is at least 50%.
97. The application-ready seal cap according to any of embodiments 92-96 wherein the seal cap is visibly transparent.
98. The application-ready seal cap according to any of embodiments 92-97 wherein the seal cap comprises a polyurethane polymer.
99. The application-ready seal cap according to any of embodiments 92-97 wherein the seal cap comprises a polythioether polymer.

100. The application-ready seal cap according to any of embodiments 92-97 wherein the seal cap comprises a polysulfide polymer.
101. The application-ready seal cap according to any of embodiments 92-97 wherein the seal cap comprises a fluorinated thermoplastic polymer.
102. The application-ready seal cap according to any of embodiments 92-97 wherein the seal cap comprises a THV polymer.
103. The application-ready seal cap according to any of embodiments 92-97 wherein the seal cap comprises a fluorinated thermoset polymer.
104. The application-ready seal cap according to any of embodiments 92-97 wherein the seal cap comprises a engineering thermoplastic.
105. The application-ready seal cap according to any of embodiments 92-97 wherein the seal cap comprises a PEEK polymer.
106. The application-ready seal cap according to any of embodiments 92-97 wherein the seal cap comprises a mixture of a polymer and a nanoparticulate filler.
107. The application-ready seal cap according to any of embodiments 92-106 wherein the seal cap comprises a mixture of a polymer and a nanoparticulate curative.
108. The application-ready seal cap according to any of embodiments 92-107 wherein the seal cap and sealant comprise different materials.
109. The application-ready seal cap according to any of embodiments 92-108 wherein the seal cap and sealant do not comprise different materials.
110. The application-ready seal cap according to any of embodiments 92-109 wherein the uncured sealant is translucent.
111. The application-ready seal cap according to any of embodiments 92-109 wherein the uncured sealant is translucent to the extent that the average light transmission through one millimeter of the uncured sealant in the 360-750 nm wavelength range is at least 20%.
112. The application-ready seal cap according to any of embodiments 92-109 wherein the uncured sealant is translucent to the extent that the average light transmission through one millimeter of the uncured sealant in the 360-750 nm wavelength range is at least 50%.
113. The application-ready seal cap according to any of embodiments 92-113 wherein the uncured sealant is visibly transparent.
114. The application-ready seal cap according to any of embodiments 92-113 wherein the uncured sealant cures to form a material that is translucent.
115. The application-ready seal cap according to any of embodiments 92-113 wherein the uncured sealant cures to form a material that is translucent to the extent that the average light transmission through one millimeter of the material in the 360-750 nm wavelength range is at least 20%.
116. The application-ready seal cap according to any of embodiments 91-114 wherein the uncured sealant cures to form a material that is translucent to the extent that the average light transmission through one millimeter of the material in the 360-750 nm wavelength range is at least 50%.
117. The application-ready seal cap according to any of embodiments 92-116 wherein the uncured sealant cures to form a material that is visibly transparent.
118. The application-ready seal cap according to any of embodiments 921-117 wherein the sealant comprises a polyurethane polymer.
119. The application-ready seal cap according to any of embodiments 921-117 wherein the sealant comprises a polythioether polymer.
120. The application-ready seal cap according to any of embodiments 92-117 wherein the sealant comprises a polysulfide polymer.
121. The application-ready seal cap according to any of embodiments 92-120 wherein the sealant comprises a mixture of a polymer and a nanoparticulate filler.
122. The application-ready seal cap according to any of embodiments 92-121 wherein the sealant comprises a mixture of a polymer and a nanoparticulate curative.
123. The application-ready seal cap according to any of embodiments 92-122 maintained at a temperature of less than 5° C.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:
1. A method of protecting a fastener comprising the steps of:
   a) providing a fastener;
   b) providing a seal cap which defines an interior, wherein the seal cap is optically translucent;
   c) applying an uncured sealant to the interior of the seal cap or to the fastener or to both;
   d) positioning the seal cap over the fastener such that at least a portion of the fastener resides in the interior of the seal cap; and
   e) curing the sealant by application of actinic radiation to the sealant through the seal cap.
2. The method according to claim 1 wherein the fastener protrudes from a first surface of a substrate article and wherein, following steps c), d) and e), every portion of the fastener which protrudes from the first surface of the substrate article is covered by cured sealant or seal cap or both.
3. The method according to claim 1 wherein application of actinic radiation causes the sealant to be substantially fully cured in less than 60 seconds.
4. A method of protecting a fastener comprising the steps of:
   f) providing a fastener;
   g) providing a seal cap which defines an interior, wherein the seal cap is optically translucent, and wherein the interior of the seal cap contains a quantity of an uncured sealant;
   h) positioning the seal cap over the fastener such that at least a portion of the fastener resides in the interior of the seal cap; and
   j) curing the sealant by application of actinic radiation to the sealant through the seal cap.
5. The method according to claim 4 wherein the seal cap and uncured sealant recited in step g) are at a temperature of less than 5° C., and wherein the method additionally comprises the step of:
   i) warming the seal cap and uncured sealant to a temperature of at least 20° C.
6. The method according to claim 5 wherein the fastener protrudes from a first surface of a substrate article and wherein, following step j), every portion of the fastener which protrudes from the first surface of the substrate article is covered by cured sealant or seal cap or both.
7. The method according to claim 5 wherein the seal cap is visibly transparent.

8. The method according to claim 4 wherein the seal cap comprises a polyurethane polymer.

9. The method according to claim 4 wherein the seal cap comprises a polythioether polymer.

10. The method according to claim 4 wherein the seal cap comprises a THV polymer.

11. The method according to claim 4 wherein the seal cap comprises a mixture of a polymer and a nanoparticulate curative.

12. The method according to claim 4 wherein the seal cap and sealant comprise different materials.

13. The method according to claim 4 wherein application of actinic radiation causes the sealant to be substantially fully cured in less than 60 seconds.

14. A method of protecting a fastener comprising the steps of:
  k) providing a fastener;
  l) providing a seal cap mold which defines an interior;
  m) applying an uncured sealant to the interior of the seal cap mold or to the fastener or to both, wherein the uncured sealant is translucent;
  n) positioning the seal cap mold over the fastener such that at least a portion of the fastener resides in the interior of the seal cap mold; and
  o) curing the sealant by application of actinic radiation to the sealant through the seal cap mold.

15. The method according to claim 14 wherein the fastener protrudes from a first surface of a substrate article and wherein, following steps m), n) and o), every portion of the fastener which protrudes from the first surface of the substrate article is covered by sealant.

16. The method according to claim 14 wherein the uncured sealant is translucent.

17. The method according to claim 14 wherein the uncured sealant is visibly transparent.

18. The method according to claim 14 wherein the uncured sealant cures to form a material that is translucent.

19. The method according to claim 14 wherein the uncured sealant cures to form a material that is visibly transparent.

20. The method according to claim 14 wherein the sealant comprises a polyurethane polymer.

21. The method according to claim 14 wherein the sealant comprises a polythioether polymer.

22. The method according to claim 14 wherein the sealant comprises a mixture of a polymer and a nanoparticulate curative.

\* \* \* \* \*

UNITED STATES PATENT AND TRADEMARK OFFICE
CERTIFICATE OF CORRECTION

PATENT NO.        : 9,650,150 B2
APPLICATION NO.   : 14/783913
DATED             : May 16, 2017
INVENTOR(S)       : Jonathan Zook It is certified that error appears in the above-identified patent and that said Letters Patent is hereby corrected as shown below:

In the Specification

Column 7
Line 12, delete ""THV 200" from 3M Company." and insert the same on Column 7, Line 11 as a continuation of the same paragraph.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*